US011231479B2

(12) United States Patent
Wisherd et al.

(10) Patent No.: US 11,231,479 B2
(45) Date of Patent: Jan. 25, 2022

(54) FREQUENCY CHANNEL DIVERSITY FOR REAL-TIME LOCATING SYSTEMS, METHODS, AND COMPUTER PROGRAM PRODUCTS

(71) Applicant: ZEBRA TECHNOLOGIES CORPORATION, Lincolnshire, IL (US)

(72) Inventors: David S. Wisherd, Carmel, CA (US); James J. O'Hagan, McHenry, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/722,168

(22) Filed: Dec. 20, 2019

(65) Prior Publication Data

US 2020/0124694 A1 Apr. 23, 2020

Related U.S. Application Data

(63) Continuation of application No. 15/596,717, filed on May 16, 2017, now Pat. No. 10,551,476, which is a (Continued)

(51) Int. Cl.
*G01S 1/08* (2006.01)
*G01S 5/02* (2010.01)
*G01S 5/06* (2006.01)

(52) U.S. Cl.
CPC ............. *G01S 5/0221* (2013.01); *G01S 1/08* (2013.01); *G01S 5/0226* (2013.01); *G01S 5/0252* (2013.01); *G01S 5/06* (2013.01)

(58) Field of Classification Search
CPC ... G01S 5/02; G01S 5/021; G01S 5/14; G01S 5/0221; G01S 5/0226; G01S 5/0252; G01S 5/06; G01S 1/08; H04W 64/00
(Continued)

(56) References Cited

U.S. PATENT DOCUMENTS 2,292,387 A 8/1942 Markey et al.
5,347,280 A 9/1994 Schuermann
(Continued)

FOREIGN PATENT DOCUMENTS

DE 60216027 T2 6/2007
WO 96/25673 A1 8/1996
(Continued)

OTHER PUBLICATIONS

Office Action for German Applicatino No. 112011102332.4 dated Apr. 26, 2013.
(Continued)

Primary Examiner — Harry K Liu

(57) ABSTRACT

Provided are architectures, systems, methods, and computer program products for real-time object locating and position determination using frequency channel diversity for transmitting and receiving position determination signals including bursts of location signals. Channelized frequency diversity of a short burst of small location signals that "hop" across multiple frequency channels is used to collectively produce a quasi-wideband position determination signal. Object tags operating with frequency channel diversity for transmitting location signals of position determination signals require low power consumption, but can still efficiently provide adequate position determination signals for reliable position determination.

12 Claims, 9 Drawing Sheets

Related U.S. Application Data continuation of application No. 14/323,534, filed on Jul. 3, 2014, now Pat. No. 9,684,054, which is a continuation of application No. 12/836,164, filed on Jul. 14, 2010, now Pat. No. 8,786,495.

(58) Field of Classification Search
USPC .......................................................... 342/451
See application file for complete search history.

(56) References Cited

U.S. PATENT DOCUMENTS

| | | | |
|---|---|---|---|
| 5,828,693 A | 10/1998 | Mays et al. | |
| 7,215,698 B2 | 5/2007 | Darby et al. | |
| 7,474,891 B2 | 1/2009 | Toms et al. | |
| 7,590,739 B2* | 9/2009 | Swildens | G06F 9/50 370/252 |
| 8,107,451 B2* | 1/2012 | Agbaria | H04W 4/02 370/338 |
| 9,037,154 B2* | 5/2015 | van Diggelen | G01S 19/396 455/456.1 |
| 9,119,216 B2* | 8/2015 | Berberana Fernandez-Murias | H04W 72/085 |
| 2005/0129139 A1 | 6/2005 | Jones et al. | |
| 2007/0230424 A1 | 10/2007 | Wisherd | |
| 2007/0127040 A1 | 11/2007 | Corp | |
| 2007/0280182 A1 | 12/2007 | Wisherd et al. | |
| 2008/0129396 A1* | 6/2008 | Kato | H03L 7/093 331/1 A |
| 2008/0143482 A1* | 6/2008 | Shoarinejad | G01S 13/878 340/10.1 |
| 2008/0150691 A1* | 6/2008 | Knadle | G06K 7/10346 340/10.1 |
| 2008/0155090 A1* | 6/2008 | Ruscin | G06Q 50/30 709/224 |
| 2008/0186136 A1 | 8/2008 | Raphaeli et al. | |
| 2008/0198902 A1 | 8/2008 | Malladi | |
| 2009/0243932 A1 | 10/2009 | Moshfeghi | |
| 2010/0072380 A1 | 3/2010 | Britton, Jr. et al. | |
| 2011/0003607 A1* | 1/2011 | Forenza | H04B 7/0626 455/501 |
| 2011/0128128 A1* | 6/2011 | Austin | G06K 7/109 340/10.3 |
| 2011/0169613 A1* | 7/2011 | Chen | G01S 3/043 340/10.4 |
| 2012/0013509 A1 | 1/2012 | Wisherd et al. | |
| 2014/0073071 A1 | 3/2014 | Diorio et al. | |

FOREIGN PATENT DOCUMENTS

| | | |
|---|---|---|
| WO | 2007/089778 A1 | 8/2007 |
| WO | 2007127040 A1 | 11/2007 |
| WO | 2009/021664 A1 | 2/2009 |

OTHER PUBLICATIONS

International Search and Written Opinion for International Application No. PCT/US2011/043940 dated Nov. 18, 2011.

U.S. Appl. No. 11/696,744, filed Apr. 5, 2007; In re: Wisherd; entitled Wireless Local Area Network System and Receiver Adapted for Use Thereof and Associated Method.

U.S. Appl. No. 61/239,492, filed Sep. 3, 2009; In re: Wohl; entitled Method, Apparaus, and Computer Program Product for Wireless Signal Storage With Signal Recognition Detection Triggering.

U.S. Appl. No. 11/692,250, filed Mar. 28, 2007; In re: Wisherd; entitled Wireless Local Area Network Receiver and Associated Method (Copy not provided).

ZigBee—Wikipedia, the free encyclopedia [online] retrieved Mar. 17, 2010. Retrieved from the Internet <URL:http://en.wikipedia.org/wiki/Zigbee>. 6 pages.

Frequency-hopping spread spectrum—Wikipedia, the free encyclopedia [online] retrieved Mar. 17, 2010. Retrieved from the Internet <URL:http://en.wikipedia.org/wikiFrequency_hopping>. 4 pages.

Spread spectrum—Wikipedia, the free encyclopedia [online] [retrieved Mar. 17, 2010], Retrieved from the Internet: <URL http://en.wikipedia.org/wiki/Spread_spectrum>. 6 pages.

Carrier sense multiple access—Wikipedia, the free encyclopedia [online] [retrieved Mar. 17, 2010]. Retrieved from the Internet: <URL http://en.wikipedia.org/wiki/Carrier_sense_multiple_access>. 4 pages.

Carrier sense multiple access collision detection—Wikipedia, the free encyclopedia [online] [retrieved Mar. 17, 2010], Retrieved from the Internet: <URL:http://en.wikipedia.org/wiki/Carrier_sense_multiple_access_with_collision_detection>. 2 pages.

IEEE 802.15.4a—Wikipedia, the free encyclopedia [online] [retrieved Mar. 17, 2010]. Retrieved from the Internet: <URL http:// en.wikipedia.org/wiki/IEEE_802.15.4a> 2 pages.

Office Action for Chinese Application No. 201180042681.2 dated Dec. 9, 2014. (Copy not provided; available in U.S. Appl. No. 14/323,534, to which priority is claimed).

Torvmark, Frequency Hopping System, Texas Instruments, Application Note AN014, p. 4. (Copy not provided; available in U.S. Appl. No. 14/323,534, to which priority is claimed).

Office Action from Chinese Patent Application No. 201180042681.2 dated Mar. 7, 2014. (Copy not provided; available in U.S. Appl. No. 14/323,534, to which priority is claimed).

Office Action from Chinese Patent Application No. 201180042681.2 dated Aug. 13, 2014. (Copy not provided available in U.S. Appl. No. 14/323,534, to which priority is claimed).

\* cited by examiner

900 POSITION DETERMINATION SIGNAL

| 901 HEADER | 920 TAG ID | 924 DATA LOAD PART 1 of 2 ||
|---|---|---|---|
| 902 HEADER | 920 TAG ID | 924 DATA LOAD PART 1 of 2 ||
| 903 HEADER | 920 TAG ID | 910 HEADER | 920 TAG ID |
| 904 HEADER | 920 TAG ID | 911 HEADER | 920 TAG ID |
| 905 HEADER | 920 TAG ID | 912 HEADER | 920 TAG ID |
| 906 HEADER | 920 TAG ID | 913 HEADER | 920 TAG ID |
| 907 HEADER | 920 TAG ID | 914 HEADER | 920 TAG ID |
| 908 HEADER | 920 TAG ID | 915 HEADER | 920 TAG ID |
| 909 HEADER | 920 TAG ID | 916 HEADER | 920 TAG ID |

930 POSITION DETERMINATION SIGNAL

| 931 HEADER | 920 TAG ID | 926 DATA LOAD PART 2 of 2 ||
|---|---|---|---|
| 932 HEADER | 920 TAG ID | 926 DATA LOAD PART 2 of 2 ||
| 933 HEADER | 920 TAG ID | 940 HEADER | 920 TAG ID |
| 934 HEADER | 920 TAG ID | 941 HEADER | 920 TAG ID |
| 935 HEADER | 920 TAG ID | 942 HEADER | 920 TAG ID |
| 936 HEADER | 920 TAG ID | 943 HEADER | 920 TAG ID |
| 937 HEADER | 920 TAG ID | 944 HEADER | 920 TAG ID |
| 938 HEADER | 920 TAG ID | 945 HEADER | 920 TAG ID |
| 939 HEADER | 920 TAG ID | 946 HEADER | 920 TAG ID |

FIG. 9

1000 POSITION DETERMINATION SIGNAL

| | | |
|---|---|---|
| 1001 HEADER | 1020 TAG ID | 1031 DATA LOAD PART 1 OF 6 |
| 1002 HEADER | 1020 TAG ID | 1031 DATA LOAD PART 1 OF 6 |
| 1003 HEADER | 1020 TAG ID | 1032 DATA LOAD PART 2 OF 6 |
| 1004 HEADER | 1020 TAG ID | 1032 DATA LOAD PART 2 OF 6 |
| 1005 HEADER | 1020 TAG ID | 1033 DATA LOAD PART 3 OF 6 |
| 1006 HEADER | 1020 TAG ID | 1033 DATA LOAD PART 3 OF 6 |
| 1007 HEADER | 1020 TAG ID | 1034 DATA LOAD PART 4 OF 6 |
| 1008 HEADER | 1020 TAG ID | 1034 DATA LOAD PART 4 OF 6 |
| 1009 HEADER | 1020 TAG ID | 1035 DATA LOAD PART 5 OF 6 |
| 1010 HEADER | 1020 TAG ID | 1035 DATA LOAD PART 5 OF 6 |
| 1011 HEADER | 1020 TAG ID | 1036 DATA LOAD PART 6 OF 6 |
| 1012 HEADER | 1020 TAG ID | 1036 DATA LOAD PART 6 OF 6 |
| 1013 HEADER | 1020 TAG ID | |
| 1014 HEADER | 1020 TAG ID | |
| 1015 HEADER | 1020 TAG ID | |
| 1016 HEADER | 1020 TAG ID | |

FIG. 10

FREQUENCY CHANNEL DIVERSITY FOR REAL-TIME LOCATING SYSTEMS, METHODS, AND COMPUTER PROGRAM PRODUCTS

CROSS-REFERENCE TO RELATED APPLICATIONS

This patent arises from a continuation of U.S. patent application Ser. No. 15/596,717, filed May 16, 2017, which is a continuation of U.S. patent application Ser. No. 14/323,534, filed Jul. 3, 2014, now U.S. Pat. No. 9,684,054, which is a continuation of U.S. patent application Ser. No. 12/836,164, filed Jul. 14, 2010, now U.S. Pat. No. 8,786,495, which are hereby incorporated herein in their entireties by reference.

FIELD OF THE INVENTION

Embodiments of the present invention relate generally to wireless data transmissions and, more particularly, relate to wireless data transmissions using frequency channel diversity for real-time locating systems, methods, and computer program products.

BACKGROUND

Position determination is increasingly important for both commercial and personal applications. Real-time locating systems (RTLS) are used and relied upon for tracking objects, such as determining the location of an object within storage, shipping, retail, and/or manufacturing situations. Wireless transmitters or tags are commonly attached to or embedded in objects to provide wireless position determination signals to one or more wireless receivers or readers. Information about and/or from the wireless position determination signals can be used to determine a location of the object.

Many traditional and more recently developed real-time locating systems are typically challenged by similar problems, including available power, signal strength, interference, and available bandwidth. Generally, increased reliability of the wireless position determination signal from an object tag to a receiver will result in increased accuracy in the information that is available to determine the position of the object. One way to increase the reliability of the wireless position determination signal is to increase the bandwidth of the signal. However, increasing the bandwidth of the signal requires more energy (e.g., battery power), requires that the increased bandwidth be available for use, and typically causes increased interference problems. Many real-time locating systems are also challenged by infrastructure costs. Improving position determination typically has a corresponding cost increase, such as to increase the number of receivers or to use more robust object tags.

Numerous technologies are available to implement different real-time locating systems corresponding to the relevant application of the technology and desired results. And significant improvements have been made to various technologies that can be used for real-time locating systems. However, even in view of available technologies and improvements, it is still desirable to improve upon these existing techniques to address remaining limitations of the various technologies and to provide alternate technologies that may be preferred in certain instances. For example, there is a need in the art for improved architectures, systems, methods, and computer program products for real-time object locating and position determination that decrease and/or avoid problems of existing technologies. Similarly, for example, there is a need in the art for alternate technologies for real-time object locating and position determination that may be preferred in certain instances.

SUMMARY

In light of the foregoing background, embodiments of the present invention provide architectures, systems, methods, and computer program products for real-time object locating and position determination using frequency channel diversity for transmitting and receiving position determination signals in the form of location signal bursts, i.e., each position determination signal is a burst of wireless location signals. Embodiments of the present invention may advantageously use object tags that require low power consumption, but can still efficiently provide adequate position determination signals for reliable position determination. For example, by using frequency channel diversity narrow bandwidth location signal bursts, less power may be used than using ultrawideband (UWB) transmissions. Similarly, for example, by using frequency channel diversity frequency hopping for bursts of narrow bandwidth location signals, position determination accuracy improves over what is possible with a single narrow channel signal. Embodiments of the present invention also may advantageously use off-the-shelf hardware and existing infrastructures, which may be helpful to decrease costs and increase opportunities to employ applications of embodiments of the present invention. Additional advantages of using frequency channel diversity for position determination are described further herein.

Embodiments of methods of the present invention are provided that determine the position of an object based upon data for a plurality of separate wireless location signals transmitted over multiple frequency channels by the object and received by a plurality of receivers and transmitted from the plurality of receivers to a computer to perform the position determination. The multiple frequency channels of another embodiment may be selected from a predetermined set of available frequency channels. The plurality of separate wireless location signals of a further embodiment may be transmitted over a consecutive series of frequency channels. Position determination may be achieved in yet a further embodiment by correlating data from at least two of the plurality of receivers for at least one of the separate wireless location signals transmitted over one of the frequency channels. Alternatively, or in addition, position determination may be achieved in yet a further embodiment by correlating data from one of the plurality of receivers for one of the separate wireless location signals transmitted over one of the frequency channels and data from another of the plurality of receivers for another of the separate wireless location signals transmitted over another of the frequency channels. Data may be discarded in yet a further embodiment if not desired for determining the position of the object, such as if the data for a wireless location signal is not transmitted from at least three of the plurality of receivers. For example, in some embodiments, data may be discarded if determined to be outside of an acceptable range of values, and the acceptable range of values may be determined based upon the data from the plurality of receivers. In yet a further embodiment, a data load partition between two or more of the separate wireless location signals may be compiled to facilitate or supplement the position determination. It should be expressly contemplated and understood that one or more of the above functions of the several described embodiments may be combined, and will typically be combined, when not inherently precluded as exclusive alternate functions, to achieve various embodiments of combinations of functions of the present invention. In this respect, it should also be expressly contemplated and understood that redundancy and/or over-determination may be preferred in an embodiment of the present invention to improve the accuracy of the position determination and are, therefore, not inherently precluded as exclusive alternate functions, but instead are typically additive functions.

Embodiments of wireless tags of the present invention are provided that include a controller and a wireless transmitter. The controller may be configured to generate a plurality of location signals for collective individual transmission over multiple frequency channels of a predetermined set of available frequency channels. The wireless transmitter may be configured to transmit the location signals of the position determination signal over the multiple frequency channels upon instruction by the controller to cause the transmission of the location signals over at least two of the predetermined set of available frequency channels. In another embodiment, the controller may be configured to determine if one of the predetermined set of available frequency channels is in use and, when that frequency channel is in use, to at least temporarily exclude that frequency channel from the multiple frequency channels used to transmit the plurality of location signals. In yet another embodiment, the controller may be configured to partition a data load between two or more of the plurality of location signals and, optionally, the data load may be evenly distributed amongst the partitions. Further, the data load may be partitioned between fewer of the plurality of location signals in the number of frequency channels of the predetermined set of available frequency channels. In yet another embodiment, the controller may be configured to cause the wireless transmitter to transmit the location signals over at least two consecutive frequency channels of the predetermined set of available frequency channels. In yet another embodiment, the predetermined set of available frequency channels may comprise sixteen channels. In addition, or alternatively, in yet another embodiment, the frequency channels of the predetermined set of available frequency channels may be 5 MHz channels. It should be expressly contemplated and understood that one or more of the above elements and functions of the several described embodiments may be combined, and will typically be combined, when not inherently precluded as exclusive alternate elements or functions, to achieve various embodiments of combinations of elements and/or functions of the present invention. In this respect, it should also be expressly contemplated and understood that redundancy and/or over-determination may be preferred in an embodiment of the present invention to improve the accuracy of the position determination and are, therefore, not inherently precluded as exclusive alternate elements and/or functions, but instead are typically additive elements and/or functions.

Embodiments of receivers of the present invention are provided that include a wireless receiver, a controller, and a transmitter. The wireless receiver may be configured to receive a plurality of location signals transmitted over multiple frequency channels, such as multiple frequency channels of a predetermined set of available frequency channels. The controller may be configured to determine location data of each of the plurality of location signals. The transmitter may be configured to transmit the location data of the plurality of location signals to a central computer. In another embodiment, the controller may be configured to discard location signals of the plurality of location signals that are determined to be outside of an acceptable range of values, such as determined by the controller based upon the plurality of location signals. In yet another embodiment, the controller may be configured to compile a data load partitioned between the data of two or more of the plurality of location signals, and the transmitter may transmit the data load. In yet another embodiment, the receiver may comprise a timer configured to measure an arrival time of each of the plurality of location signals, the controller may be configured to associate each of the plurality of location signals with an arrival time of each of the plurality of location signals, thereby defining the location data, and the transmitter may be configured to transmit the arrival time with each of the plurality of location signals to the central computer. In yet another embodiment, the receiver may comprise a timer configured to measure an arrival time of each of the plurality of location signals, the controller may be configured to determine the time differences of arrival between each of the plurality of location signals, thereby defining the location data, and the transmitter may be configured to transmit the time of arrival of at least one of the plurality of location signals and the time differences of arrival between each of the plurality of location signals to the central computer. It should be expressly contemplated and understood that one or more of the above elements and functions of the several described embodiments may be combined, and will typically be combined, when not inherently precluded as exclusive alternate elements or functions, to achieve various embodiments of combinations of elements and/or functions of the present invention. In this respect, it should also be expressly contemplated and understood that redundancy and/or over-determination may be preferred in an embodiment of the present invention to improve the accuracy of the position determination and are, therefore, not inherently precluded as exclusive alternate elements and/or functions, but instead are typically additive elements and/or functions.

The characteristics referred to above, as well as additional details, of the present invention are described below. Similarly, corresponding and additional embodiments of frequency channel diversity real-time locating architectures and related systems, methods, and computer program products of the present invention for position determination are also described below, including, for example, computer program products comprising a non-transitory computer-usable storage medium having control logic stored therein for effectuating position determination by a computer.

BRIEF DESCRIPTION OF THE DRAWING(S)

Having thus described embodiments of the invention in general terms, reference will now be made to the accompanying drawings, which are not necessarily drawn to scale, and wherein:

FIG. 9 is a block diagram representative of two position determination signals according to at least one embodiment of the present invention; and FIG. 10 is a block diagram representative of a position determination signal according to at least one embodiment of the present invention.

DETAILED DESCRIPTION

Figure 1:
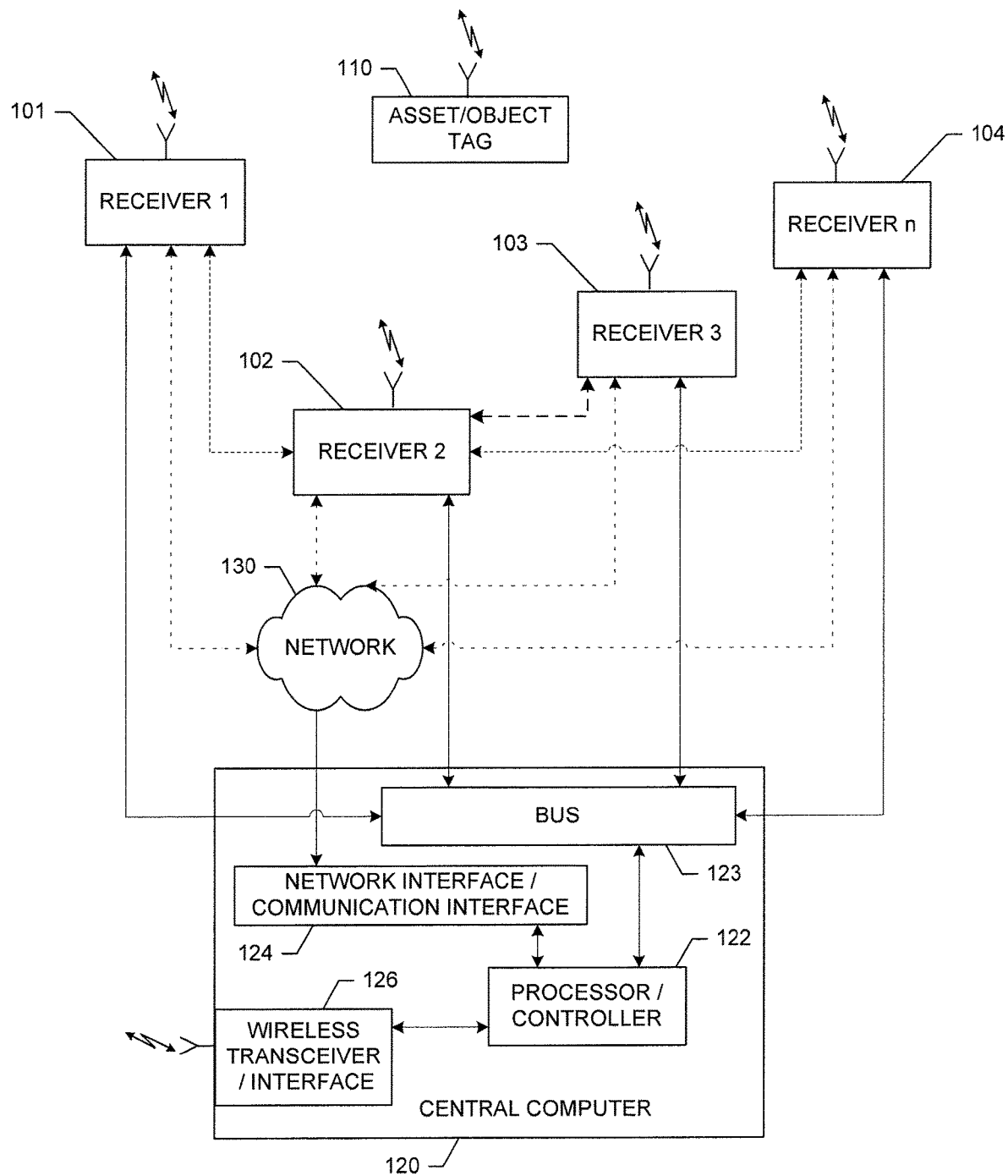
FIG. 1 is a schematic block diagram of a plurality of participant entities effectuating position determination based upon frequency channel diversity according to at least one embodiment of the present invention.

Embodiments of the present invention will now be described more fully hereinafter with reference to the accompanying drawings, in which some, but not all embodiments of the invention are shown. Indeed, embodiments of the present invention may be embodied in many different forms and should not be construed as limited to the embodiments set forth herein; rather, these embodiments are provided so that this disclosure will satisfy applicable legal requirements. Like reference numbers refer to like elements throughout. As used herein, the terms "data," "content," "information," and similar terms may be used interchangeably to refer to data capable of being transmitted, received, operated on, and/or stored in accordance with an embodiment of the present invention. Moreover, the term "exemplary," as used herein, is not provided to convey any qualitative assessment, but instead to merely convey an illustration of an example.

While the present invention is described below in detail with reference to several exemplary embodiments, it will be appreciated from the following description that many types of objects and various practical applications of real-time locating position determination may be used with and benefit from embodiments of the present invention, such as determining the location of products in storage, vehicles in transit, packages in shipment, inventory in a retail store, parts in manufacturing plants, animals on a farm or ranch, cars in a parking lot or garage, a cell phone or remote control in a home, patients or equipment in a hospital, and movable and/or portable assets in a business office (e.g., video projectors, laptops, printers, etc.). In general, any type of physical object for which position determination may be beneficial may employ embodiments of the present invention. Embodiments of the present invention are not limited to particular objects, applications, or environments. Moreover, embodiments of the present invention are scalable in a number of ways, such as based upon desired distance transmissions and accuracy of position data.

Embodiments of the present invention provide architectures, systems, methods, and computer program products for real-time object locating and position determination using frequency channel diversity for transmitting and receiving position determination signals in the form of location signal bursts, i.e., each position determination signal is a burst of wireless location signals. As used herein, frequency channel diversity refers to the use of multiple frequency channels to transmit separate wireless signals (i.e., channelization of wireless signals), as well as associated concepts of frequency hopping. For example, wireless position determination signals may be channelized as separate location signals in multiple narrow frequency bands and collectively but individually transmitted in a burst across a broader frequency band, i.e., a position determination signal may be a burst of frequency channel diversity location signals. Frequency channel diversity of embodiments of the present invention is described below in further detail.

By using frequency channel diversity, embodiments of the present invention may use object tags that require low power consumption, but can still efficiently provide adequate location signals for reliable position determination. For example, by using frequency channel diversity narrow bandwidth signals, less power may be used than using ultrawideband (UWB) transmissions. For example, a IEEE 802.15.4a object tag can operate effectively in a beacon or transmitting mode with frequency channel diversity for an embodiment of the present invention over sixteen 5 MHz channels in the 2.4 GHz frequency band with a 250 kbps data rate and 15.36 ms pulse spacing with a 1 mW wireless power output.

By using frequency channel diversity narrow bandwidth channelized location signals in forms of frequency hopping, position determination accuracy improves for embodiments of the present invention over what is possible with a single narrow channel signal. The use of multiple frequency channels achieves diversity of measured data for position determination. Generally, as the diversity of the measured data increases, the accuracy of the position determination also increases. Thus, by separately channelizing multiple location signals in narrow frequency bands across a broader frequency band, embodiments of the present invention are able to create a pseudo-ultrawideband (or pseudo-wideband) position determination signal and achieve quality and accuracy of position data using a low power ultrawideband (UWB) signal. Moreover, embodiments of the present invention employ two forms of diversity, frequency and time, both of which may improve accuracy of position determination.

Embodiments of the present invention may use multiple narrow frequency bands for channels within one or more broader frequency bands. The narrow frequency bands of channels may all be in a single broader frequency band, such as the ISM 2.4 GHz frequency band. Alternatively, narrow frequency bands of channels may be within multiple frequency bands, such as from an ultra high frequency (UHF, 300 MHz to 3 GHz) band and also from the super high frequency (SHF) 5.8 GHz band. For example, an embodiment of the present invention could use multiple 900 MHz channels and multiple 2.4 GHz channels. Another exemplary embodiment of the present invention could use the three separate 2.4 GHz 802.11b/g/h channels and the eight 5 GHz 802.11a channels as a predetermined set of available frequency channels. A further exemplary embodiment of the present invention could combine a 6 GHz ultrawideband pulse beacon with a 2.4 GHz ISO 24730 direct-sequence spread spectrum (DSSS) beacon, where UWB is advantageous for location accuracy, such as where line-of-sight is available, and where ISO 24730 provides better coverage, such as in cluttered environments and over long ranges. Frequency bands may be assigned by regulatory bodies and/or standards organizations, such as depending upon a country in which an embodiment of the present invention is used. Further, frequency bands may be selected for optimum use with frequency hopping techniques applied by embodiments of the present invention and specific applications of embodiments of the present invention, such as to avoid frequency bands with known interference in a particular operating environment.

Similar to existing real-time location systems, embodiments of the present invention may use various forms of data and corresponding algorithms to determine the position of an object, such as angle of arrival (AoA), line of sight (LoS), time of arrival (ToA), time difference of arrival (TDoA) or differential time of arrival (DToA), perceived channel power indicator (RCPI), received signal strength indication (RSSI), time of flight (ToF), and combinations thereof. Time of arrival (ToA), time difference of arrival (TDoA), and received signal strength indication (RSSI) may be used most commonly. In addition, embodiments of the present invention may be combined with other forms of diversity to further enhance or improve accuracy of position determination. For example, embodiments of the present invention may be combined with multiple receiving antenna spatial diversity or tag radio frequency radiation polarity diversity.

Embodiments of the present invention may use narrow bandwidth channel-type wireless transmitters and receivers, or combined transmitters and receivers (i.e., transceivers (XMTR) or transponders (XPDR)). Such devices typically have lower costs and power consumption than wideband and ultrawideband (UWB) counterparts. Embodiments of the present invention also may advantageously use off-the-shelf hardware and existing infrastructures, such as a IEEE 802.15.4a application-specific integrated circuit (ASIC) tag described above, which may be particularly helpful to decrease costs. In addition to IEEE 802.15.4a products, other commercially available products may also be available, such as alternate ASIC or FPGA products, and such as products designated to operate in accordance with the ZigBee™ specifications of the ZigBee Alliance of San Ramon, Calif.

In addition to taking advantage of affordable transceivers available in multiple bands, embodiments of the present invention may also take advantage of compatible infrastructures. For example, smart power meters and power grid management provide opportunities for combining wireless infrastructure for alternative applications to also be used for position determination. In one particular example, which may be characterized as part of a local power grid management, LED lights for residential and/or commercial applications may be equipped with transceivers operating in accordance with IEEE 802.15.4a, ZigBee, or a like specification. Such products are being developed by Philips Electronics North America Corp. of Andover, Mass., and Somerset, N.J., which is a subsidiary of Koninklijke Philips Electronics N.V. of Amsterdam, the Netherlands. The transceivers of LED lights may be used to control the lighting of the LED lights, such as for turning on and off or dimming the LED lights. In such a manner, each LED light may be wirelessly controlled, for example, using a mesh network architecture to communicate with and between the LED lights. In an exemplary application of an embodiment of the present invention, one or more LED lights with a transceiver may be used as a frequency channel diversity receiver to determine the position of an object. For example, LED light transceivers in a home may be used to locate a remote control, such as a cable, satellite, or TV remote control lost between the couch cushions, or to locate a pet, such as the collar on a cat hiding under a bed. Further, a mesh network architecture may be advantageous to provide redundancy and/or overdetermination of location data, although any one or more receiver configurations and communication architectures may be used with embodiments of the present invention. More generally, hardware and networking infrastructure established for other applications, such as LED light transceivers or mesh network communications, may also be used as location infrastructure of embodiments of the present invention.

FIG. 1 is a schematic block diagram of a plurality of participant entities effectuating position determination based upon frequency channel diversity according to at least one embodiment of the present invention. A single asset or object tag 110 is illustrated relative to multiple receivers 1, 2, 3, . . . n 101, 102, 103, 104. For example, object tag 110 may be located proximate to and in line-of-sight with receivers 1 through n 101, 102, 103, 104 and may cooperate to provide position determination of the object tag 110 relative to receivers 1 through n 101, 102, 103, 104, at least one of which may have a known position relative to an operating environment or on a larger physical and/or geographic scale and, thus, by extrapolation, the position of object tag at 110 may also be determined relative to the operating environment or on the larger physical and/or geographic scale. The object tag 110 will at least include a wireless transmitter for collectively but individually transmitting a burst of location signals over multiple frequency channels. Further details of embodiments of object tags of the present invention are provided with reference to FIG. 5. The receivers 1 through n 101, 102, 103, 104 will similarly at least include a wireless receiver for collectively receiving a burst of location signals over multiple frequency channels. Further details of embodiments of receivers of the present invention are provided with reference to FIG. 6.

Figure 4:
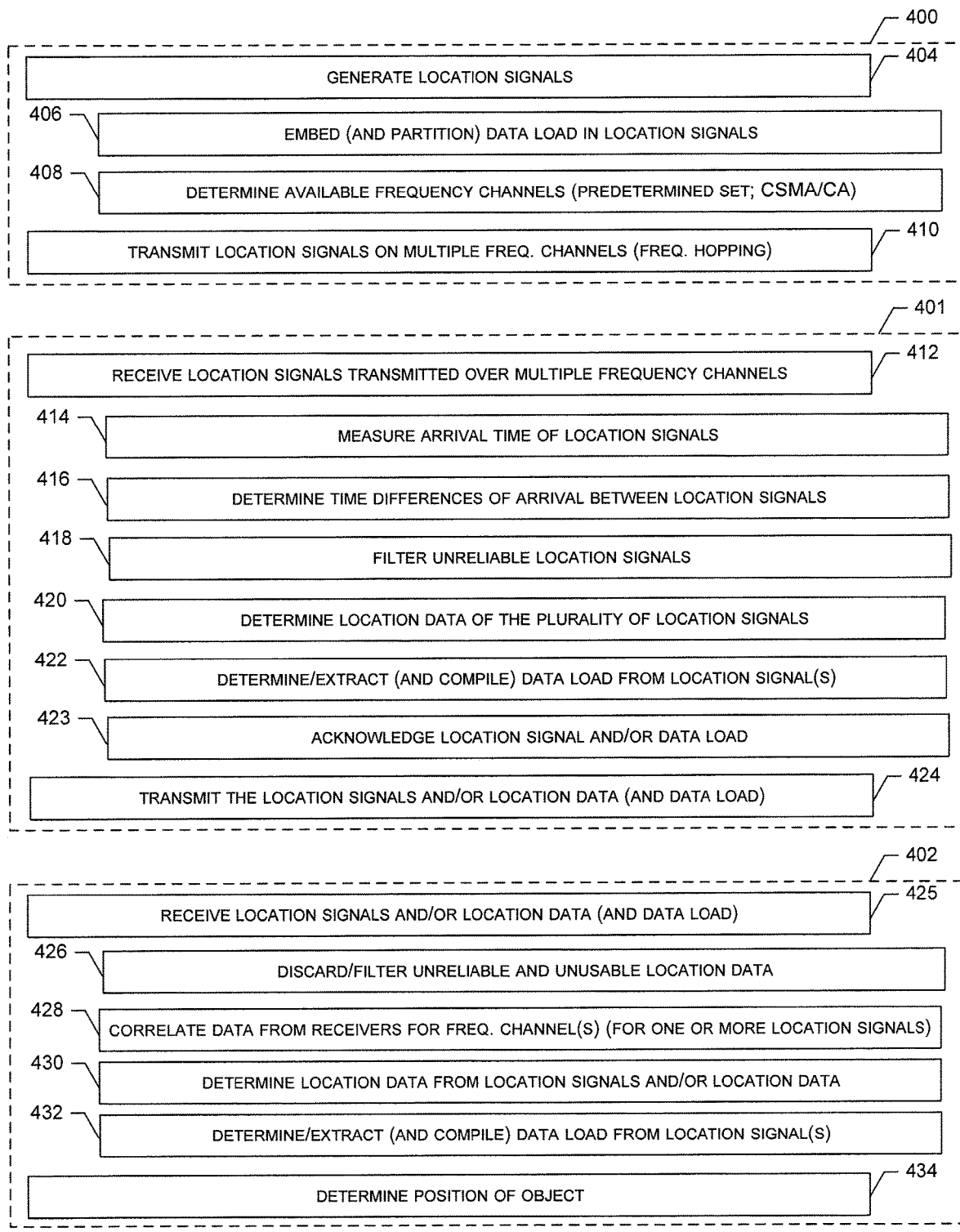
FIG. 4 is a functional block diagram of frequency channel diversity location position determination according to at least one embodiment of the present invention.

In operation, and with reference to FIG. 4, object tag 110 will generate a plurality of separate wireless location signals, as identified in block 404. Each location signal can provide the same basic information because the location signals are used for position determination, not communication. When channelized signals have traditionally been used, partitions of a single signal carry different data loads over multiple channels to create a single signal transmission, such as for communication whereby signal partitions carry relatively large and different data loads to transmit signal to accomplish the communication, i.e., channelizing different information on each channel, typically transmitted simultaneously and/or transmitted simultaneously with other signal transmissions from other "speakers" on the communication network. By comparison, when embodiments of the present invention operate for position determination, separate location signals do not need to carry large or different data loads. Rather, identical or similar small location signals are repeatedly sent over a short period of time on a plurality of frequency channels, thereby providing the ability to obtain a more accurate position determination of the tag and/or object transmitting the location signals. Embodiments of the present invention use channelized frequency diversity of a short burst of small location signals that "hop" across multiple frequency channels to collectively produce a quasi-wideband position determination signal that can more accurately measure time and, therefore, more accurately locate the transmitting tag and/or object than traditionally possible using a single position determination signal in a narrow frequency band and using lower power consumption than traditionally possible using a wideband or ultrawideband (UWB) position determination signal.

Although each location signal of a position determination signal will typically provide the same basic information used for position determination, location signals of a position determination signal of embodiments of the present invention may differ in some respects. For example, location signals of a position determination signal may differ due to network overhead, differences in data load, and acceptable truncations of data, such as only transmitting part of a tag ID to decrease the overall signal load and necessary network throughput. More specifically, each location signal typically will include information to identify the specific tag transmitting the location signals of a position determination signal. This may be an identification (ID or UID) number for the tag, like a license plate number (LPN). This information may be in an ID field for the location signals. In addition, one or more location signals of a position determination signal may include additional data, referred to herein as a data load. A data load, if included, may be in a data field for the location signals.

The transmission and frequency hopping of the plurality of location signals over multiple frequency bands, as identified in block 410, may occur according to any one or more different sequential, algorithmic, pseudo-random, or random ways. As a general matter, the hardware and/or controller of an object tag will operate over multiple frequency channels. Further, the hardware and/or controller of an object tag may also define a predetermined set of available frequency channels that may be used. For example, as described above, if an object tag includes a IEEE 802.15.4a transceiver, the object tag may operate over sixteen 5 MHz channels in the 2.4 GHz frequency band with a 250 kbps data rate and 15.36 ms pulse spacing with a 1 mW wireless power output. This hardware configuration may define the predetermined set of available frequency channels. Alternately, if an application of an embodiment of present invention uses an object tag with this hardware configuration but existing operations already use one or more of the sixteen 16 frequency channels, the hardware and/or controller may be further configured to define a predetermined set of available frequency channels that are the remaining available subset of the sixteen 16 frequency channels that may be used by the object tag.

Figure 2:
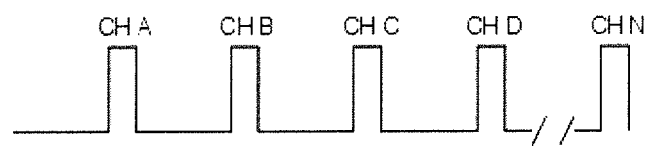
FIG. 2 is a partial diagram representative of a burst of frequency channel diversity location signals according to at least one embodiment of the present invention.
Figure 3:
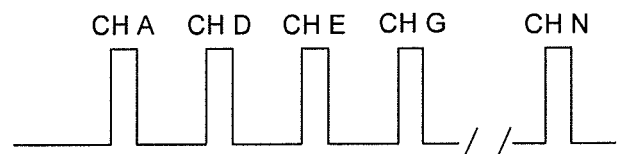
FIG. 3 is another partial diagram representative of a burst of frequency channel diversity location signals according to at least one embodiment of the present invention.

FIGS. 2 and 3 are partial diagrams representative of frequency channel diversity location signals according to embodiments of the present invention. In the exemplary frequency diagram of FIG. 2, frequency hopping ideally occurs sequentially, such as in a numerical order, across a consecutive series of channels A, B, C, D, . . . N. The exemplary frequency diagram of FIG. 3, illustrates several possible frequency hopping algorithms. For example, the frequency hopping may also ideally occur sequentially across a consecutive series of channels A, B, C, D, . . . N, but, such as due to high use or other frequent interference, certain channels may be skipped or omitted if determined to be in use or unreliable resulting in a sequential non-consecutive series of channels A, D, E, G, . . . N. Alternatively, the frequency hopping may be algorithmic or pseudo-random and resulting in a sequential transmission across a non-consecutive series of channels A, D, E, G, . . . N. Alternatively, the frequency hopping may result in a sequential transmission across a non-consecutive series of channels G, H, F, E, D (not illustrated) or a non-sequential transmission across a non-consecutive series of channels A, G, E, D, F, C, . . . N (not illustrated). The described frequency hopping series of channels are only exemplary, and any frequency hopping of a position determination signal comprising a burst of a plurality of location signals over multiple frequency bands, as identified in block 410, may be used for an embodiment of the present invention.

A position determination signal comprising a burst of a plurality of location signals transmitted over multiple frequency channels in accordance with an embodiment of the present invention is preferably short enough in time duration to represent a near-fixed (point) position of the object being tracked. For example, an object tag using a single IEEE 802.15.4a ASIC transceiver may transmit a frequency hopping burst of location signals over sixteen frequency channels in only 245.76 milliseconds or 15.36 ms pulse spacing per sixteen channels. In another example, an object tag using a single IEEE 802.15.4a ASIC transceiver may transmit a frequency hopping burst of location signals over sixteen frequency channels in only 230.4 milliseconds or 14.4 ms pulse spacing per sixteen channels. Embodiments of the present invention may use any length for diverse multiple frequency channel bursts. Ideally, all of the location signals for a position determination signal burst will be transmitted on the involved multiple frequency channels at the same or near-same physical location. In this way, it can be said that an object tag may "blink" to transmit a position determination signal comprising a burst of location signals so that multiple location solutions can be obtained by receivers, one location solution for each channel. For potentially faster moving objects, shorter burst time durations are preferred. For anticipated slower moving objects, longer burst time durations may be possible. For example, if an object tag is anticipated to be resting at a fixed location, a frequency hopping burst of location signals may be of any reasonable length duration because the tag is not expected to be moving. A more robust tag according to an embodiment of the present invention may include multiple transmitters to simultaneously frequency hop subsets of multiple frequency channels to decrease a total burst duration, such as to transmit a position determination signal with location signals over sixteen channels in four subsets of four channels in one fourth the total time for a single transmitter to transmit 16 locations signals over sixteen channels. A smart tag according to such an embodiment may be referred to as a multiple channel transmitter tag. A smart tag according to an embodiment of the present invention may have information regarding the movement of the tag, such as information received from the tag or determined by the tag, for example, using an accelerometer. With movement information, a controller of a smart tag according to an embodiment of the present invention may be able to dynamically adjust (shorter or longer) the time duration for a frequency hopping burst of location signals. Also, to improve position determination accuracy, an object tag may blink multiple times in succession to provide additional location solutions and/or to purposefully achieve overdetermination of the position of the object. Embodiments of the present invention may use a variety of location data processing algorithms to determine the position of an object, such as averaging, median filtering, and Kalman filtering. An object tag may also blink periodically so the position of the object may be monitored over a longer period of time.

In addition to generating a position determination signal comprising a burst of location signals, and potentially embedding a data load in one or more location signals, an object tag 110 may actively manage the multiple frequency channels used for a burst of location signals, such as to determine available frequency channels, as identified in block 408. For example, an object tag 110 may reduce the number of frequency channels and location signals transmitted thereon to reduce the potential interference with other users in those frequency channels. Such a reduction in the number of frequency channels may be predetermined to define a set of available frequency channels or may be performed dynamically to exclude one or more frequency channels. Further, for example, an object tag may "listen" to determine if a frequency channel is being used and, if so, temporarily exclude that frequency channel from the multiple frequency channels used to transmit a burst of a plurality of location signals. This will help to avoid interference with other transmissions and allows for interoperability. If something is operating in one of the frequency channels, the object tag can skip the frequency channel during the hop. In an exemplary embodiment of the present invention, an object tag 110 may include a processor or controller that operates in accordance with or similar to a carrier sense multiple access (CSMA) protocols and may advantageously operate with collision avoidance (CA), such as CSMA/CA, to actively manage frequency channels used for transmitting location signals to minimize coherent interference with other transmissions. A smart controller of an object tag of a further embodiment of the present invention may even "listen" to determine if any of the frequency channels are used frequently and should avoid trying to use the frequency channels for some period of time. This may prevent repeatedly checking a particular frequency channel only to find out that it is frequently or continually in use and not available for transmission of a location signal for a burst of location signals from the object tag. As a result of managing the multiple frequency channels used for a frequency hopping burst of location signals, an object tag may transmit a position determination signals in bursts of location signals over different subsets of multiple frequency channels of a predetermined set of available frequency channels.

Figure 8:
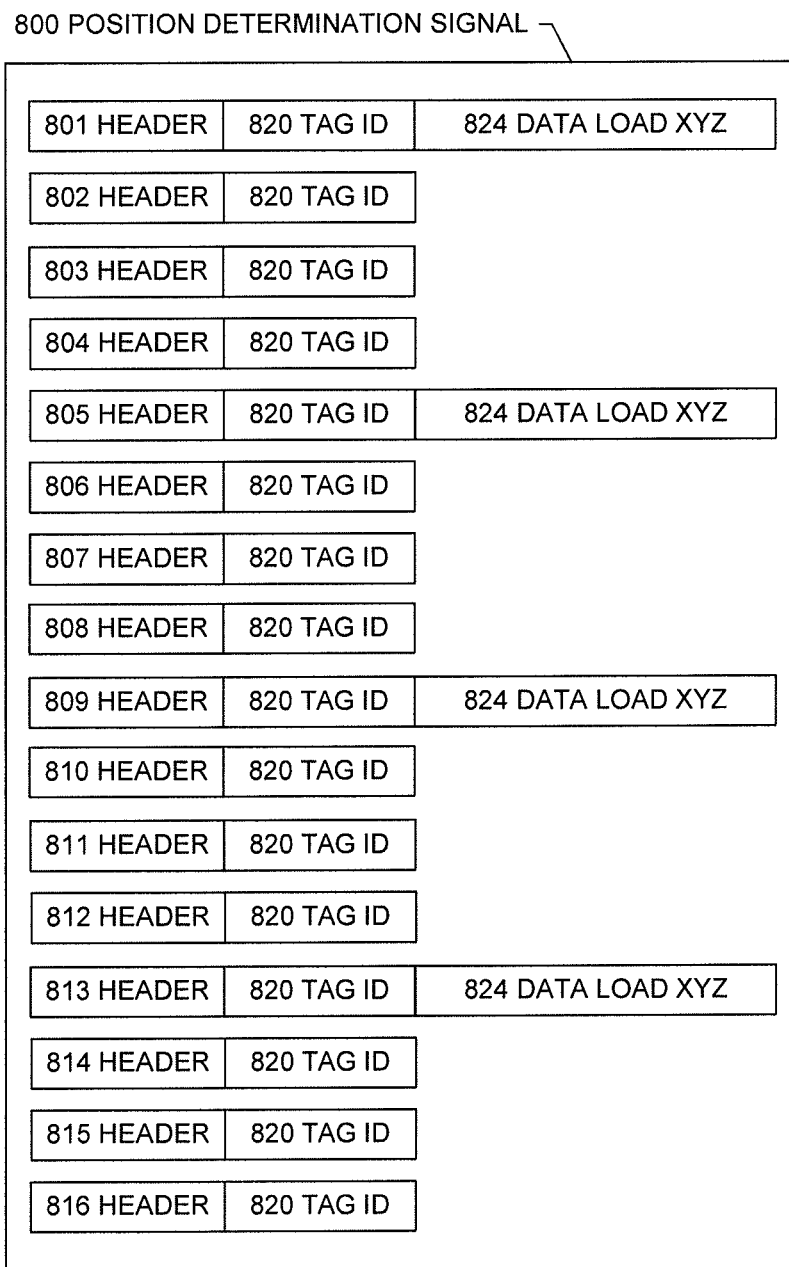
FIG. 8 is a block diagram representative of a position determination signal according to at least one embodiment of the present invention.

If a data load is included (embedded) in one or more location signals of a position determination signal, as identified in block 406, to minimize the necessary network throughput, an object tag 110 may minimize sending a data load, such as to only embed a limited number of instances of the data load in location signals of the position determination signal, such as one or twice or some other number of times less than the number of location signals. For example, as illustrated in FIG. 8, a data load XYZ 824 transmitted in position determination signal 800 may not be retransmitted in each location signal of a position determination signal 800, but transmitted only four times throughout the entire frequency hopping burst of location signals, and only the tag ID 820 (or necessary portion thereof) and necessary network header 801, 802, 803, 804, 805, 806, 807, 808, 809, 810, 811, 812, 813, 814, 815, 816 may be transmitted in each location signal of the position determination signal 800. Further, an object tag 110 operating in accordance with an embodiment of the present invention may partition a data load between one or more of the location signals of each of two or more position determination signals. For example, as illustrated in FIG. 9, a data load may be split between location signals of two position determination signals 900, 930, such two smaller data loads 924 (part 1 of 2) and 926 (part 2 of 2) to cut down on the airtime of location signals carrying the data load. Similarly, a data load may be partitioned and/or repeated between fewer location signals of a position determination signal than the number of frequency channels of a predetermined set of available frequency channels, such as to account for the possibility that one or more frequency channels may be in use and less than all of the frequency channels may be included in a burst of location signals, thereby ensuring that the entire data load may still be transmitted even if all the frequency channels are not used. If sixteen frequency channels are available, a data load may be partitioned and/or repeated between 2 to 15 location signals, such as 12 location signals, or, more generally, between 2 to N−1 location signals where N is the number of possible available frequency channels. For example, FIG. 10 illustrates an embodiment where a data load is split into 6 parts 1031, 1032, 1033, 1034, 1035, 1036, and each part is repeated twice over a total of 12 location signals of a position determination signal 1000. Even further, an object tag 110 may attempt to balance the data load by partitioning (dividing) and evenly distributing the data between location signals transmitted over multiple frequency channels. This approach can minimize the airtime of location signals on each of the involved multiple frequency channels. Also, particularly if a data load is included, a receiver may send an acknowledgment (ACK) of the confirmed receipt to a location signal or data load of a position determination signal, such as identified in block 423. A receiver may validate a location signal, for example, based upon a tag ID and a cyclic redundancy check (CRC). To minimize necessary network throughput, acknowledgment of a location signal may be sent only when a data load, or a partition thereof, is detected in a location signal or a burst of location signals for a position determination signal.

Referring again to the schematic block diagram of FIG. 1 and the functional block diagram of FIG. 4, the object tag 110 blinks to transmit a burst of location signals over multiple frequency channels, as identified in block 410, such as in a consecutive or non-consecutive sequence of multiple frequency channels of a predetermined set of available frequency channels. Receivers 1 through n 101, 102, 103, 104, if within range of the transmission of the location signals from the object tag 110 and within line-of-sight or otherwise without wireless transmission obstructions, should receive the location signals transmitted over multiple frequency channels, as identified in block 412. Because of differences in the receivers 1 through n 101, 102, 103, 104, such as positions, lines-of-sight, and interference, each of receivers may not receive all of the transmitted location signals of position determination signal. The location signals that are received by each of the receivers 1 through n 101, 102, 103, 104 may be used for position determination as described further herein. Depending upon the type(s) of location algorithms used for position determination by an embodiment of the present invention (e.g., AoA, ToA, DToA, RSSI, etc.), the receivers may record or determine additional information used by the receiver or a central computer as location data. For example, a receiver may include a timer, which may also be a clock, and measure arrival time of location signals, as identified in block 414. A receiver may then associate each of the plurality of location signals with the corresponding arrival time of each respective one of the plurality of location signals.

Receivers 1 through n 101, 102, 103, 104 transmit the location signals and/or location data (e.g., arrival times) of a position determination signal to a central processing location, as identified in block 424, such as to processor or controller 122 of central computer 120, where position determination can be performed from data received by the central computer 120 from multiple receivers 1 through n 101, 102, 103, 104, as identified in block 434. Receivers 1 through n 101, 102, 103, 104 may be directly connected to central computer 120, such as by wired or wireless communications between the receivers 1 through n 101, 102, 103, 104 and central computer 120. For example, central computer 120 may include a wireless transceiver or interface 126 to receive data transmissions from wireless transmitters of receivers 1 through n 101, 102, 103, 104. Also, a bus 123 may be used to directly couple receivers to central computer 120. Alternatively, receivers 1 through n 101, 102, 103, 104 may be indirectly connected to central computer 120, such as through a network 130 and a network interface or communication interface 124 of central computer 120. Further, receivers 1 through n 101, 102, 103, 104 may be indirectly connected to central computer at 120, such as through network communications between receivers 1 through n 101, 102, 103, 104, illustrated, for example, in FIG. 1 as a serial connection between receiver 1 101 and receiver 2 102. Alternate embodiments of the present invention may use one or more of a variety of network communication architectures, such as direct, serial, parallel, mesh, and tree network communication architectures, to communicate between receivers and/or between receivers and a central processing location, as well as using one or more multi-component architectures, such as employing one or more bus architectures. Although a central processing location is illustrated in FIG. 1 by central computer 120 as a separate entity from any one of the receivers, alternate embodiments of the present invention may include all or part of the hardware performed by central computer 120 at one or more of the receivers and have a single central processing location or a co-hosted central processing location.

Receivers 1 through n 101, 102, 103, 104 may perform additional functions, as illustrated in FIG. 4. For example, a receiver may determine set of time differences of arrival (TDoA) between location signals, as identified in block 416. If time differences of arrival are determined by a receiver, the receiver does not need to transmit each of the arrival times for the location signals to the central processing location, but need only transmit the time of arrival of at least one of the plurality of location signals and the time differences of arrival between either the one location signal for which the arrival time is transmitted and each of the other plurality of location signals or a serial sequence including each of the plurality of location signals including the one location signal for which the arrival time is transmitted. For example, if there are 4 location signals A, B, C, and D, the TDoA of those signals could be represented by the ToA of A and the set of time differences of arrival between {AB, AC, AD} or represented by the ToA of A and the set of time differences of arrival between {AB, BC, CD}. Either set of data will permit calculation of ToA data for all 4 of the location signals. Performing such processing at a receiver can de-centralize the processing for position determination and decrease the processing load on the centralized processing location, and potentially reduce network communication traffic. Whether measuring arrival times of location signals, determining time differences of arrival between location signals, or performing another location-based function, a receiver will determine some location data for the plurality of location signals, as illustrated at block 420, which can be transmitted to and used by a central processing location for position determination. A receiver may also filter or discard unreliable location signals, as identified in block 418, or unreliable position determination signals. For example, if a receiver cannot validate a location signal, the receiver may discard the location signal. If a receiver determines that data for a location signal is outside of an acceptable range of values, the receiver may discard the location signal, such as if the time of flight is twice as long as expected, the location signal may be discarded as a potential reflection. A receiver may determine an acceptable range of values for location signals based upon a plurality of location signals received by the receiver. For example, if a receiver receives a burst of sixteen location signals, the receiver may average the signal strengths for all the sixteen location signals, and if one of the location signals has a signal strength that is more than a predetermined range (e.g., 5%, a predetermined value or magnitude, or any other function) above or below the average signal strength for all of the sixteen location signals, the receiver may discard the outlier location signal. Various additional or alternate selections and filtering may be accomplished based upon any number of characteristics of the received location signals and according to any number of corresponding functions, including filtering or discarding any available location signals for an unreliable position determination signal. Also, if a data load, or partition thereof, is included in one or more of the location signals, a receiver may determine (extract) the data load from the one or more location signals, as identified in block 422. If the data load is partitioned between location signals transmitted over multiple frequency channels for a position determination signal, a receiver may compile the data load partitions.

As described above, receivers 1 through n 101, 102, 103, 104 transmit the location signals and/or location data (e.g., arrival times) of position determination signals to a central processing location, as identified in block 424, such as to processor or controller 122 of central computer 120, where position determination can be performed from data received by the central computer 120 from multiple receivers 1 through n 101, 102, 103, 104, as identified in block 434. The central computer 120 receives the location signals and/or location data, and possibly also a data load if embedded in the location signals of one or more position determination signals, from the receivers 1 through n 101, 102, 103, 104, as identified in block 425. Like receivers 1 through n 101, 102, 103, 104, the central computer 120 may also filter or discard unreliable location signals, as identified in block 426, or unreliable position determination signals. For example, if a location signal or data for a location signal is not transmitted from at least three of the plurality of receivers, the central computer 120 may weight that signal differently or discard that location signal or its corresponding position determination signal altogether. If the central computer 120 determines that data for a location signal is outside of an acceptable range of values, the central computer 120 may discard the location signal, such as if the time of flight is twice as long as expected, the location signal may be discarded as a potential reflection. The central computer 120 may determine an acceptable range of values for location signals based upon a plurality of location signals or data for a plurality of location signals received from the receivers. For example, the central computer 120 may average the signal strengths for all the location signals from one or more of the receivers, and if one of the location signals has a signal strength that is more than a predetermined range (e.g., 3%, a predetermined value or magnitude, or any other function) above or below the average signal strength, the central computer 120 may discard the outlier location signal. Various additional or alternate selections and filtering may be accomplished based upon any number of characteristics of the received location signals and according to any number of corresponding functions, including filtering or discarding any available location signals for an unreliable position determination signal. Also, if a data load, or partition thereof, is included in one or more of the location signals of a position determination signal, the central computer 120 may determine (extract) the data load from the one or more location signals of the position determination signal, as identified in block 432. If the data load is partitioned between location signals transmitted over multiple frequency channels of a position determination signal, as described above, the central computer 120 may compile the data load partitions. If the data load is partitioned between location signals of at least two position determination signals, as described above, the central computer 120 may compile the data load partitions from the position determination signals.

The central computer 120 determines the position of the object, as illustrated at block 434. To determine the position of the object, the central computer 120 may determine location data from location signals and/or location data of one or more position determination signals, as identified in block 430. For example, less than all the receivers may determine location data for the plurality of location signals received by that receiver, as illustrated at block 420. As a result, the central computer 120 may need to determine location data from location signals, similar to methods employed by the receivers to determine location data from location signals. Further, the central computer 120 may determine additional location data from preliminary location data determined by a receiver at block 420. Further, to determine the position of the object, the central computer at 120 may correlate data from receivers for frequency channels for one or more location signals, as illustrated at block 428. For example, location data from at least two of the receivers for at least one of the location signals transmitted over one of the frequency channels may be correlated. Correlating data from multiple receivers for one or more frequency channels for one or more location signals refers to the underlying computations for the various methodologies for real-time locating position determination, such as computing the distance between each receiver and the object and then computing the possible intersection of the distances to determine the position of the object. To correlate data from multiple receivers, the central computer at 120 typically will already have available the fixed position data for each receiver. In addition, various known and future developed position determination functions and improvements may also be applied by embodiments of the present invention, such as correcting for clock drift between receivers. Further, embodiment of the present invention may rely upon more than one location methodology, such as ToA and RSSI or DToA and RSSI.

FIG. 4 also illustrates the functions of blocks 404, 406, 408, and 410 as a collection 400. This illustration refers to an embodiment of the present invention where each of the functions of blocks 404, 406, 408, and 410 are performed by an object tag. Function blocks 412, 414, 416, 418, 420, 422, 423, and 424 are illustrated as a collection of 401 referring to an embodiment of the present invention where each of the functions are performed by receivers. Function blocks 425, 426, 428, 430, 432, and 434 are illustrated as a collection of 402 referring to an embodiment of the present invention where the functions are performed by a central computer. However, the functions identified in each of collections 400, 401, 402 are not exclusive for all embodiments of the present invention. For example, function blocks 416, 418, 420, and/or 422 may be performed by a central computer, rather than receivers.

Figure 5:
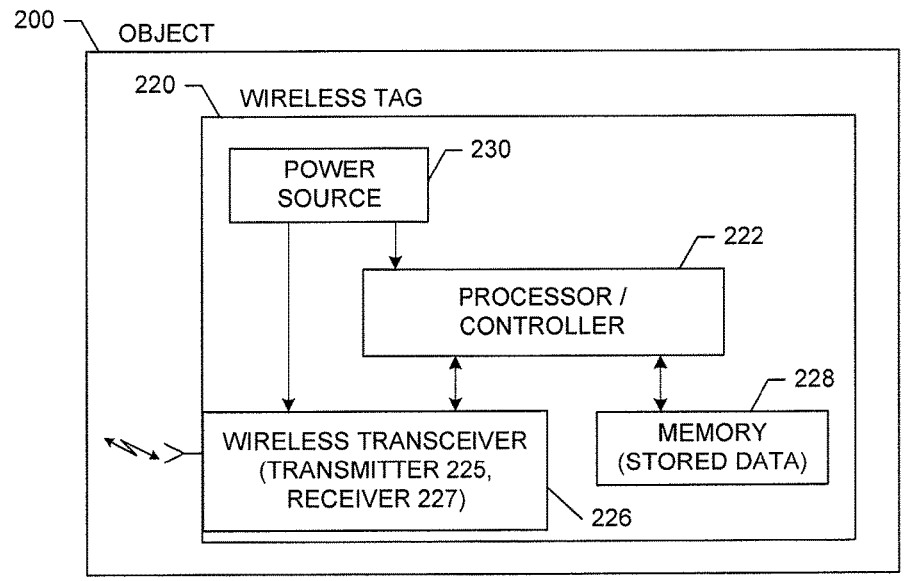
FIG. 5 is a block diagram of a wireless tag according to at least one embodiment of the present invention.

FIG. 5 illustrates a block diagram of a wireless tag according to at least one embodiment of the present invention. A wireless tag 220 may be attached to or included (embedded) as part of an object 200. Typically, wireless tag 220 will include a power source 230. Alternate embodiments of the present invention may use a transponder, in addition to or rather than a transceiver 226 or transmitter 225 that requires a power source 230. As such, wireless tag 220 may be either a passive tag or an active tag. The wireless tag 220 may also include a processor or controller 222, a wireless transceiver 226, and memory 228. The wireless transceiver 226 may include a transmitter 225 and a receiver 227. Alternate embodiments of the present invention may instead use separate transmitter 225 and receiver 227, or only a transmitter 225. The memory 228 may store data for the wireless tag 220, such as the tag ID, and may or may not be writable or updateable.

Figure 6A:
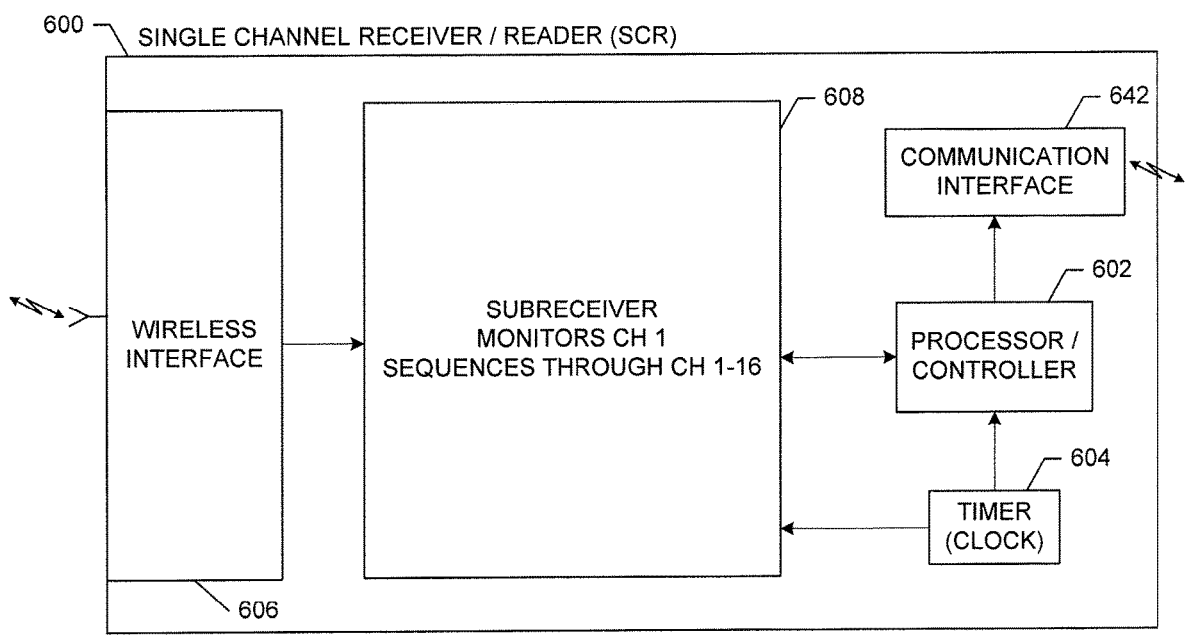
FIG. 6A is a block diagram of a single channel receiver according to at least one embodiment of the present invention.

FIG. 6A illustrates a block diagram of a single channel receiver (SCR) according to one embodiment of the present invention. Receiver 600 may include a wireless interface 606 to receive location signals for interpretation by subreceiver 608. Subreceiver 608 may be designed to monitor the first channel for the beginning of a burst sequence of location signals of a position determination signal. Upon finding a valid location signal on the first channel, subreceiver 608 may sequence in accordance with a burst channel order. Subreceiver 608 may, for example, measure tag signal RSSI and, using the timer 604, ToA. Subreceiver 608 may also include a processor or controller 602 that may direct operation of the subreceiver 608 and perform additional functionality, such as validating a location signal, calculating time difference of arrival, and extracting and compiling a data load. A single channel receiver may be a simple construction using a single ASIC and may have a low cost, but has a corresponding low tag-tracking capacity, and location signal receipt fails if detection on the monitoring channel fails. Embodiments of the present invention employing single channel receivers may benefit from multiple tag bursts (blinks) to increase the chance that single channel receivers will detect a location signal on the monitoring channel. Receiver 600 may also include at least one communication interface 642, such as to communicate with a central computer via communication interface 342.

Figure 6B:
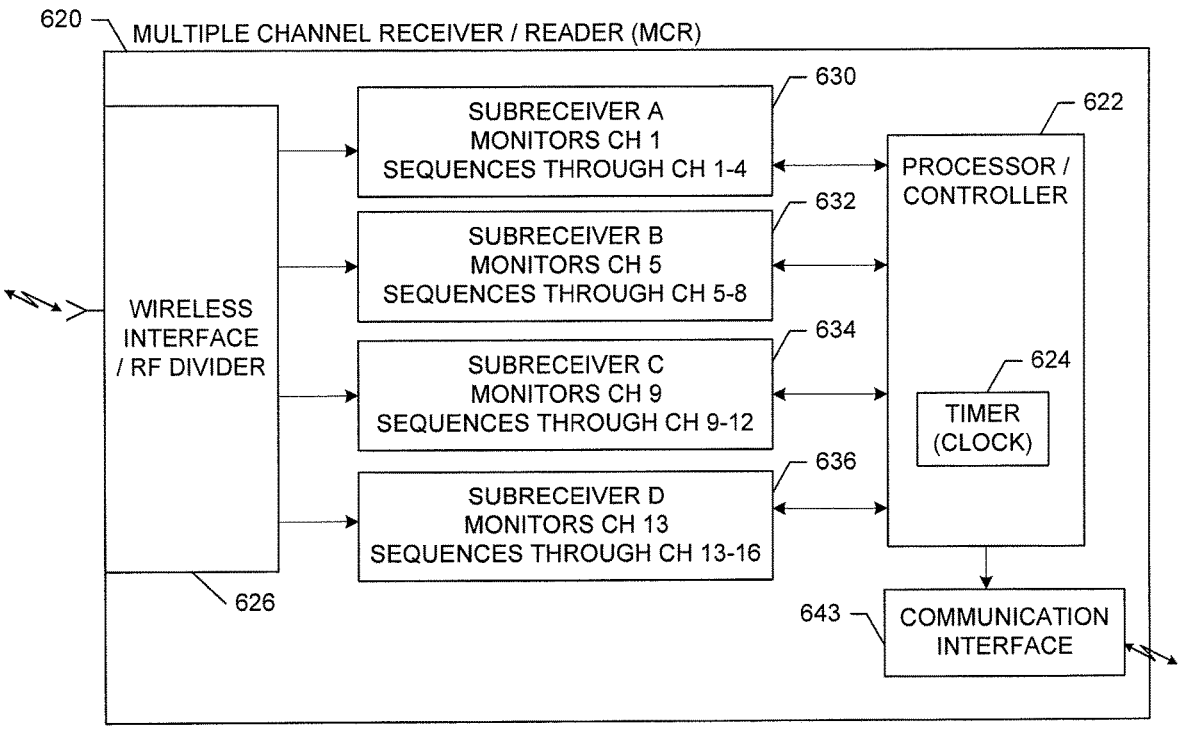
FIG. 6B is a block diagram of a multiple channel receiver according to at least one embodiment of the present invention.

FIG. 6B illustrates a block diagram of a multiple channel receiver (MCR) according to one embodiment of the present invention. The receiver 620 may include a wireless interface with a radio frequency divider 626 to divide the received location signals of a position determination signal for interpretation by subreceivers that each individually monitor a subset of possible frequency channels for the location signals. For example, subreceivers A, B, C, and D 630, 632, 634, 636 may be included that each sequence through 4 of 16 frequency channels. Each subreceiver may be a separate ASIC, have a monitoring channel, such as the first channel in the sequence for its subset of frequency channels, and will sequence through the subset of frequency channels if a location signal is detected on its monitoring channel. A multiple channel receiver may have a higher cost due to use of multiple ASICs, but will have a corresponding higher tag-tracking capacity and fewer failures. Even if a location signal receipt fails on a monitoring channel of one ASIC, the other ASICs may still receive location signals. The receiver 620 may also include a controller 622 and a timer 624. The timer 624 may be used by all of the subreceivers A, B, C, and D 630, 632, 634, 636 and/or by the controller for time of arrival measurements and, if performed, differential time of arrival computations. The controller 622 may perform additional functionality, such as validating a location signal, calculating time difference of arrival, and extracting and compiling a data load. Alternate embodiments of multiple channel receivers according to the present invention may be constructed to monitor C channels using N channels per subreceiver. For example, the illustrated embodiment includes four subreceiver ASICs. An alternate embodiment for the 2.4 GHz band may include 16 subreceiver ASICs, one for each channel, or 8 subreceiver ASICs, one for each two channels. Receiver 620 may also include at least one communication interface 643, such as to communicate with a central computer via communication interface 342.

Figure 6C:
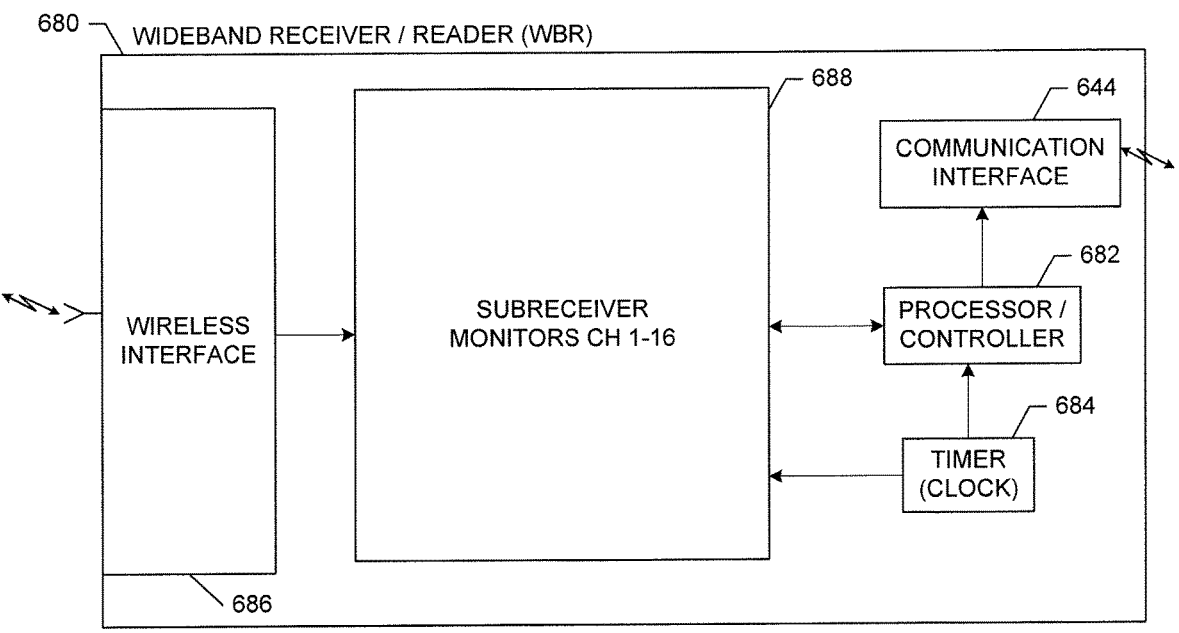
FIG. 6C is a block diagram of a wideband receiver according to at least one embodiment of the present invention.

FIG. 6C illustrates a block diagram of a wideband receiver (WBR) according to one embodiment of the present invention. Receiver 680 may include a wireless interface 686 to receive location signals for interpretation by the subreceiver 688. Subreceiver 688 may be designed to simultaneously monitor all channels of interest, such as all channels of a predetermined set of available frequency channels for location signals. Subreceiver 688 may also include a processor or controller 682 that may direct operation of the subreceiver 688 and perform additional functionality, such as validating a location signal, calculating time difference of arrival, and extracting and compiling a data load. A wideband receiver will have a high tag-tracking capacity and also will have a high reliability for location signal capture. Receiver 680 may also include at least one communication interface 644, such as to communicate with a central computer via communication interface 342.

Figure 7:
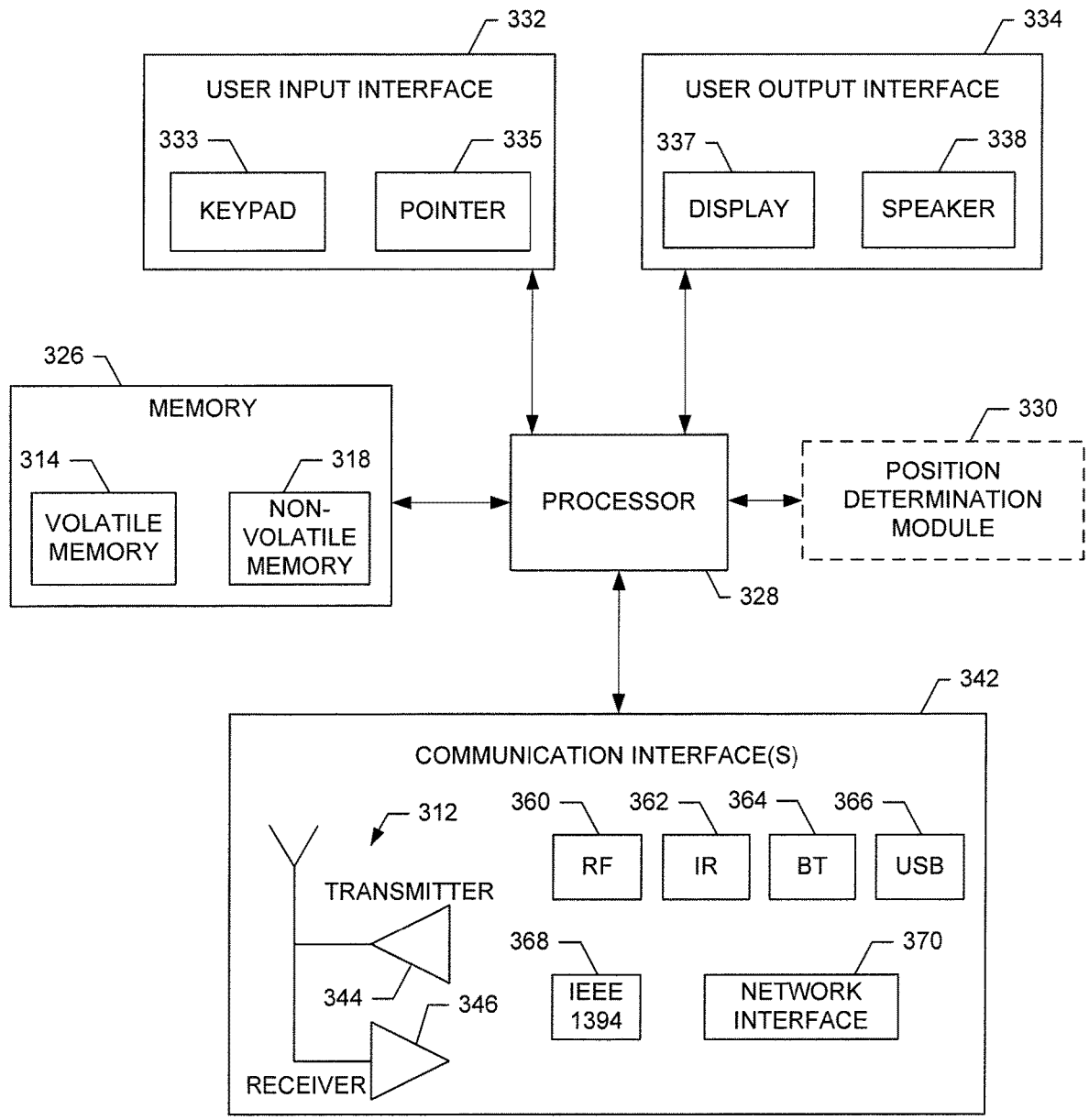
FIG. 7 is a block diagram of a computer that may be used to facilitate position determination based upon frequency channel diversity according to at least one embodiment of the present invention.

FIG. 7 illustrates a block diagram of a computer that may be used to facilitate position determination based upon frequency channel diversity according to at least one embodiment of the present invention. The computer of FIG. 7 may be capable of and configured to operate as a central processing location and central computer 120 in accordance with embodiments of the present invention. Although shown as separate entities, in some embodiments, one or more entities may support one or more logically separated but co-located entity. For example, a single entity may support a logically separate, but co-located, receiver and central computer, such as receiver 2 102 and the central computer 120. The computer of FIG. 7 includes various means for performing one or more functions in accordance with exemplary embodiments of the present invention, including those more particularly shown and described herein. It should be understood, however, that one or more of the entities may include alternative means for performing one or more like functions, without departing from the spirit and scope of the present invention. More particularly, for example, as shown in FIG. 7, the computer can include a processor, controller, or like processing element 328 connected to a memory 326. The memory may comprise volatile memory 314 and/or non-volatile memory 318. Memory 326 may be, for example, read only memory (ROM), random access memory (RAM), a flash drive, a hard drive, and/or other fixed or removable data memory or storage device. Memory 326 typically stores content, data or the like. For example, the memory typically stores content transmitted from and/or received by the computer. Also for example, the memory is a non-transitory computer-usable storage medium and stores computer program code or control logic, such as for effectuating operating systems and position determination, for the processor to perform steps associated with operation of the computer in accordance with embodiments of the present invention.

The processor 328 may also be connected to a position determination module 330. The position determination module 330 may be software and/or software-hardware components. For example, a position determination module 330 may include software and/or software-hardware components capable of performing computations on the available location signals, location data, and/or other data to determine the position of an object. The position determination module 330 may additionally or alternatively include firmware. Generally, then, the position determination module 330 can include one or more logic elements for performing various functions of position determination. As will be appreciated, the logic elements can be embodied in any of a number of different manners. In this regard, for example, the logic elements performing the functions of one or more client applications can be embodied in an integrated circuit assembly.

The processor 328 can also be connected to at least one interface or other means for displaying, transmitting and/or receiving data, content, or the like. In this regard, the interface(s) can include at least one communication interface 342 or other means for transmitting and/or receiving data, content, or the like. When the computer provides wireless communication to operate in a wireless network, the processor 328 may operate with a wireless communication subsystem 312 of the communication interface 342. More particularly, for example, the wireless communication subsystem 312 may include output 344 and input 346. The communication interface 342 can include a radio frequency (RF) transceiver or interrogator 360 so that data can be shared with and/or obtained from electronic devices in accordance with RF techniques. The computer can additionally, or alternatively, include other transceivers, such as, for example an infrared (IR) transceiver 362 and/or a Bluetooth (BT) transceiver 364 operating using Bluetooth wireless technology standardized by the Bluetooth Special Interest Group. The computer can therefore additionally or alternatively be configured for transmitting data to and/or receiving data from electronic devices in accordance with such techniques. The computer can additionally or alternatively be configured for transmitting and/or receiving data from electronic devices according to a number of different wireless networking techniques, including WLAN, WiMAX, UWB, IEEE802.15.4a, ZigBee, or the like. The communication interface 342 may also include an IEEE 1394 interface 368 and a network interface 370.

In addition to the communication interface 342, the interface(s) can also include at least one user interface that can include a user input interface 332 and a user output interface 334. The user input interface 332 can comprise any of a number of devices allowing the computer to receive data from a user, such as a microphone, a keyboard or keypad 333, a mouse or pointer 335, a touch display, a joystick, or other input device. The user output interface 334 can comprise any of a number of devices allowing the computer to provide data to a user, such as a display 337, a speaker 338, and a printer. One or more processors, memory, storage devices, and other computer elements may be used in common by a computer system and subsystems, as part of the same platform, or processors may be distributed between a computer system and subsystems, as parts of multiple platforms, such as a co-hosted central processing location of an embodiment of a frequency channel diversity real-time locating system.

According to one aspect of the present invention, the functions performed by one or more of the entities of the system, such as tag 110, receivers 1 through n 101, 102, 103, 104, central computer 120, wireless tag 220, single channel receiver 600, multiple channel receiver 620, wideband receiver 680 and the computer of FIG. 7, may be performed by various means. In addition, FIG. 4 illustrates a functional block diagram or flowchart of frequency channel diversity location position determination according to at least one embodiment of the present invention. The functions of the flowchart may be embodied in systems, methods, and computer program products according to exemplary embodiments of the invention. In this regard, each block or operation of the functional block diagram or flowchart, and combinations of blocks in the functional block diagram or flowchart, can be implemented by various means. Means for performing functions by one or more entities of the system and/or for implementing the blocks or operations of the flowcharts, and/or combinations of the blocks or operations in the flowchart, may include hardware and/or a computer program product including one or more computer program code instructions, program instructions, or executable computer-readable program code instructions. In one exemplary embodiment, one or more of the procedures described herein may be embodied by a computer program product including program code instructions may be stored by memory 326 and executed by a processor 328. As will be appreciated, any such computer program code instructions may be loaded onto a computer or other programmable apparatus (i.e., processor and/or memory hardware) to produce a machine, such that the instructions which execute on the computer or other programmable apparatus create means for implementing the functions specified in the functional block diagram and flowchart block(s) or operation(s). A computer program product for performing one or more functions of embodiments of the present invention includes a non-transitory computer-usable storage medium (also a computer-readable storage medium), such as a non-volatile storage medium, and software including computer-readable program code portions or control logic, such as a series of computer instructions, embodied in and stored on or by the computer-usable storage medium, and that can direct a computer, a processor, or other programmable apparatus to function in a particular manner, such that the instructions stored in the computer-usable storage medium produce an article of manufacture including instruction means which implement the function specified in the functional block diagram's and flowchart's block(s) or operation(s). The computer program code instructions may also be loaded onto a computer, processor, or other programmable apparatus to cause a series of operations to be performed on or by the computer, processor, or other programmable apparatus to produce a computer-implemented process such that the instructions which execute on the computer, processor, or other programmable apparatus implement the functions specified in the functional block diagram's and flowchart's block(s) or operation(s). Similarly, embodiments of the present invention may be incorporated into hardware and software systems and subsystems, combinations of hardware systems and subsystems and software systems and subsystems, and incorporated into network devices and systems. In each of these network devices and systems, as well as other devices and systems capable of using a system or performing a method of the present invention as described above, the network devices and systems generally may include a computer system including one or more processors that are capable of operating under software control to provide the techniques described above.

Accordingly, blocks or operations of the functional block diagrams and flowchart support combinations of means for performing the specified functions, combinations of operations for performing the specified functions and program instruction means for performing the specified functions. It will also be understood that one or more blocks or operations of the functional block diagram and flowchart, and combinations of blocks or operations in the functional block diagram and flowchart, can be implemented by special purpose hardware-based computer systems and/or processors which perform the specified functions or operations, or combinations of special purpose hardware and computer program code instructions.

Provided herein are improved architectures, systems, methods, and computer program products for real-time object locating and position determination using frequency channel diversity for transmitting and receiving position determination signals including bursts of location signals. Channelized frequency diversity of a short burst of small location signals that "hop" across multiple frequency channels is used to collectively produce a quasi-wideband position determination signal. Object tags operating with frequency channel diversity for transmitting location signals of position determination signals require low power consumption, but can still efficiently provide adequate position determination signal for reliable position determination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. moreover, although the foregoing descriptions and the associated drawings described exemplary embodiments in the context of certain exemplary combinations of elements and/or functions, it should be appreciated that different combinations of elements and/or functions may be provided by alternative environments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

That which is claimed:

1. A wireless tag comprising:
memory storing data comprising a tag ID;
a processor configured to:
  determine a first frequency channel and a second frequency channel from a predetermined set of available frequency channels, and
  generate a first location signal comprising the tag ID and a second location signal comprising the tag ID; and
a transmitter configured to transmit a position determination signal by transmitting the first location signal over the first frequency channel and the second location signal over the second frequency channel.

2. The wireless tag of claim 1, wherein:
the data further comprises a data load; and
the processor is further configured to partition the data load between the first location signal and the second location signal.

3. The wireless tag of claim 1, wherein:
the data further comprises a data load;
the processor is further configured to partition the data load over a second set of multiple channels to create a single signal and to define the predetermined set of available frequency channels that are remaining frequency channels from which are determined the first frequency channel and the second frequency channel, and
the transmitter is further configured to transmit the data load over the second set of multiple channels.

4. The wireless tag of claim 1, wherein the first location signal and the second location signal are used to determine position of the wireless tag.

5. The wireless tag of claim 4, wherein:
the first location signal has a first time duration,
the second location signal has a second time duration; and
the first time duration and the second time duration are dynamically adjustable.

6. The wireless tag of claim 1, where the first frequency channel and the second frequency channel are consecutive frequency channels within the predetermined set of available frequency channels.

7. The wireless tag of claim 1, wherein the first frequency channel and the second frequency channel are not consecutive frequency channels within the predetermined set of available frequency channels.

8. The wireless tag of claim 1, wherein the first frequency channel is in a first frequency band and the second frequency channel is in a second frequency band different than the first frequency band.

9. The wireless tag of claim 3, wherein the first frequency channel is in a first frequency band and the second set of multiple channels is in a separate frequency band.

10. The wireless tag of claim 1, wherein the processor is configured to determine if one of the predetermined set of available frequency channels is in use and, when that frequency channel is in use, to at least temporarily exclude that frequency channel from being the first frequency channel and the second frequency channel.

11. The wireless tag of claim 2, wherein the processor is configured to evenly partition the data load amongst the first frequency channel and the second frequency channel.

12. The wireless tag of claim 9 wherein the first frequency channel is in a 900 MHz frequency band and the multiple channels of the second set of multiple channels are in a 2.4 GHz frequency band.

* * * * *